United States Patent [19]

Yamamoto et al.

[11] Patent Number: 4,530,464

[45] Date of Patent: Jul. 23, 1985

[54] ULTRASONIC LIQUID EJECTING UNIT AND METHOD FOR MAKING SAME

[75] Inventors: Kazushi Yamamoto; Takeshi Nagai, both of Nara; Nobuyuki Hirai, Neyagawa; Shunichiro Mori, Yamatokoriyama, all of Japan

[73] Assignee: Matsushita Electric Industrial Co., Ltd., Japan

[21] Appl. No.: 512,690

[22] Filed: Jul. 11, 1983

[30] Foreign Application Priority Data

Jul. 14, 1982 [JP] Japan ................................ 57-123589

[51] Int. Cl.[3] ................................................ B23K 1/20

[52] U.S. Cl. .................................... 239/102; 228/124; 228/215; 346/140 R

[58] Field of Search ............... 228/118, 121, 122, 124, 228/215; 239/102; 346/140 R, 140 PD, 140 IJ

[56] References Cited

U.S. PATENT DOCUMENTS 1,931,311 10/1933 Young ............................ 228/118 X
3,683,212 8/1972 Zoltan ............................ 346/140 IJ
3,738,574 6/1973 Guntersdorfer et al. ........... 239/102
3,739,393 6/1973 Lyon et al. ..................... 239/102 X
3,747,120 7/1973 Stemme .......................... 346/140 IJ
3,900,162 8/1978 Titus et al. .......................... 239/102
4,047,186 9/1977 Kendall et al. ................ 346/140 IJ

FOREIGN PATENT DOCUMENTS 77636 4/1983 European Pat. Off. ........... 239/102

*Primary Examiner*—Kenneth J. Ramsey
*Attorney, Agent, or Firm*—Lowe, King, Price & Becker

[57] ABSTRACT

An ultrasonic liquid ejecting unit comprises a piezoelectric transducer coated with a conductive film on each of its front and rear surfaces, a nozzle plate secured to the transducer to form a bimorph vibration system and a body having a liquid chamber defined by the nozzle plate in pressure transmitting relation with the liquid in the chamber. The nozzle plate is coated on each of its front and rear surfaces with a pattern of adjoining regions of cement-active and cement-inactive properties. The cement-active region on the front surface conforms to the rear surface of the transducer and the cement-active region of the rear surface conforms to a contact surface of the body. When fabricating the unit, a cementing material in liquid phase, such as molten solder, is applied to each surface of the nozzle plate to exclusively wet the cement-active regions prior to contacting the nozzle plate to the transducer and to the body.

11 Claims, 4 Drawing Figures

ULTRASONIC LIQUID EJECTING UNIT AND METHOD FOR MAKING SAME

BACKGROUND OF THE INVENTION

The present invention relates to an ultrasonic liquid ejecting unit for discharging atomized liquid droplets and a method for making the unit. The invention is useful for universal applications including fuel burners and printers.

A piezoelectric oscillating system for effecting atomization of liquids is described in U.S. Pat. No. 3,738,574. Such a piezoelectric oscillating system comprises a piezoelectric transducer mechanically coupled by a frustum to a vibrator plate for inducing bending vibrations therein, a fluid tank and a pump for delivering fluid to the vibrating plate which is disposed at an oblique angle with respect to the force of gravity above the tank. A wick is provided to aid in diverting excess liquid from the plate to the tank. The frustum serves as a means for amplifying the energy generated by the transducer. To ensure oscillation stability, however, the frustrum needs to be machined to a high degree of precision and maintained in a correct position with respect to a conduit through which the pumped fluid is dropped on the vibrator plate and the amount of fluid to be delivered from the pump must be accurately controlled. Further disadvantages are that the system is bulky and expensive and requires high power for atomizing a given amount of liquid. In some instances 10 watts of power is required for atomizing liquid of 20 cubic centimeters per minute, and yet the droplet size is not uniform.

U.S. Pat. No. 3,683,212 discloses a pulsed liquid ejection system comprising a conduit which is connected at one end to a liquid containing reservoir and terminates at the other end in a small orifice. A tubular transducer surrounds the conduit for generating stress therein to expel a small quantity of liquid through the orifice at high speeds in the form of a stream to a writing surface.

U.S. Pat. No. 3,747,120 discloses a liquid ejection apparatus having an inner and an outer liquid chamber separated by a dividing plate having a connecting channel therein. A piezoelectric transducer is provided rearward of the apparatus to couple to the liquid in the inner chamber to generate rapid pressure rises therein to expel a small quantity of liquid in the outer chamber through a nozzle which is coaxial to the connecting channel.

While the liquid ejection systems disclosed in U.S. Pat. Nos. 3,683,212 and 3,747,120 are excellent for printing purposes due to their compact design, small droplet size and stability in the direction of discharged droplets, these systems have an inherent structural drawback in that for the liquid to be expelled through the nozzle the pressure rise generated at the rear of liquid chamber must be transmitted all the way through the bulk of liquid to the front of the chamber. As a result, if the liquid contains a large quantity of dissolved air, cavitation tends to occur producing bubbles in the liquid.

Copending U.S. patent application Ser. No. 434,533 filed Oct. 14, 1982 by N. Maehara et al, titled "Arrangement for Ejecting Liquid, and assigned to the same assignee of the present invention discloses a liquid ejecting device comprising a housing defining a liquid chamber, a ring-shaped piezoelectric transducer and a vibrating member secured to the transducer in pressure transmitting relationship with the liquid in the chamber.

Further copending U.S. patent application Ser. No. 458,881, filed Jan. 17, 1983 by N. Maehara, titled "Ultrasonic Liquid Ejecting Apparatus" and assigned to the same assignee as the present invention also discloses a a similar liquid ejecting device in which the vibrating member is excited at a resonant frequency thereof. These copending U.S. applications eliminate the problems associated with the aforesaid U.S. patents. However, problems still exists in these copending applications in that the vibrating member is cemented by a solder to adjacent surfaces of the transducer and the housing and the solder tends to flow outside the periphery of the contact surfaces. This creates an imbalance in the vibration system, causing nonuniform oscillation wave patterns. Furthermore, the adjacent surfaces of the components fail to provide affinity to soldering material, so that they are not satisfactorily wetted by the molten solder and voids occur between them.

SUMMARY OF THE INVENTION

It is therefore an object of the invention to provide an ultrasonic liquid ejection unit having a flawless vibration system which ensures uniform patterns of oscillation and reliability, while retaining the advantages of the aforesaid copending applications.

According to a first feature of the invention, the ultrasonic liquid ejecting unit comprises an apertured piezoelectric transducer having a pair of first and second conductive films coated on opposite sides thereof, and a body having a contact surface and a chamber behind it for holding liquid therein and an intake port connected to the chamber for supplying liquid thereto from a liquid supply source. A nozzle plate is provided having first and second patterns of adjoining regions of cement-active and cement-inactive properties on opposite sides thereof. The cement-active region of the first pattern conforms to and is secured to the second surface of the transducer by way of a layer of cementing material so that the nozzle opening is positioned within the opening of the transducer, and the cement-active region of the second pattern conforms to and is secured to the contact surface of the body by way of a layer of cementing material to define said chamber to thereby establish a pressure transmitting relationship with the liquid in the chamber.

According to a second feature of the invention, the ultrasonic liquid ejecting unit is fabricated by the steps of: providing a piezoelectric transducer having first and second opposite flat surfaces each coated with a conductive film and an aperture through the first and second surfaces; providing a nozzle plate of a material having a first cement-active surface for making contact with the second surface of the transducer and a second cement-active surface and a nozzle opening; providing a body having a contact surface for making contact with the second cement-active surface of the nozzle plate and a chamber behind the contact surface for holding liquid therein. A first and a second pattern of adjoining regions of cement-inactive and cement-active properties are formed on the first and second surfaces of the nozzle plate respectively, wherein the cement-active regions of the first and second patterns conforms respectively to the second surface of the transducer and to the contact surface of the body. A cementing material in liquid phase is applied to the first and second surfaces of the nozzle plate so that a first layer of cement is formed on the first cement-active region and a second layer of cement is formed on the second cement-active region. Due to the surrounding cement-inactive regions, the first and second layers of cement are confined to within the areas of the cement-active regions. The cement-applied first and second surfaces of the nozzle plate are brought into contact with the second surface of the transducer and the contact surface of the body, respectively, whereby the nozzle plate defines the chamber to allow ejection of liquid droplets through the nozzle opening and the aperture to the outside when the nozzle plate is deflected toward the chamber upon energization of the transducer.

BRIEF DESCRIPTION OF THE DRAWINGS

The present invention will be described in further detail with reference to the accompanying drawings, in which.

DETAILED DESCRIPTION

Figure 1:
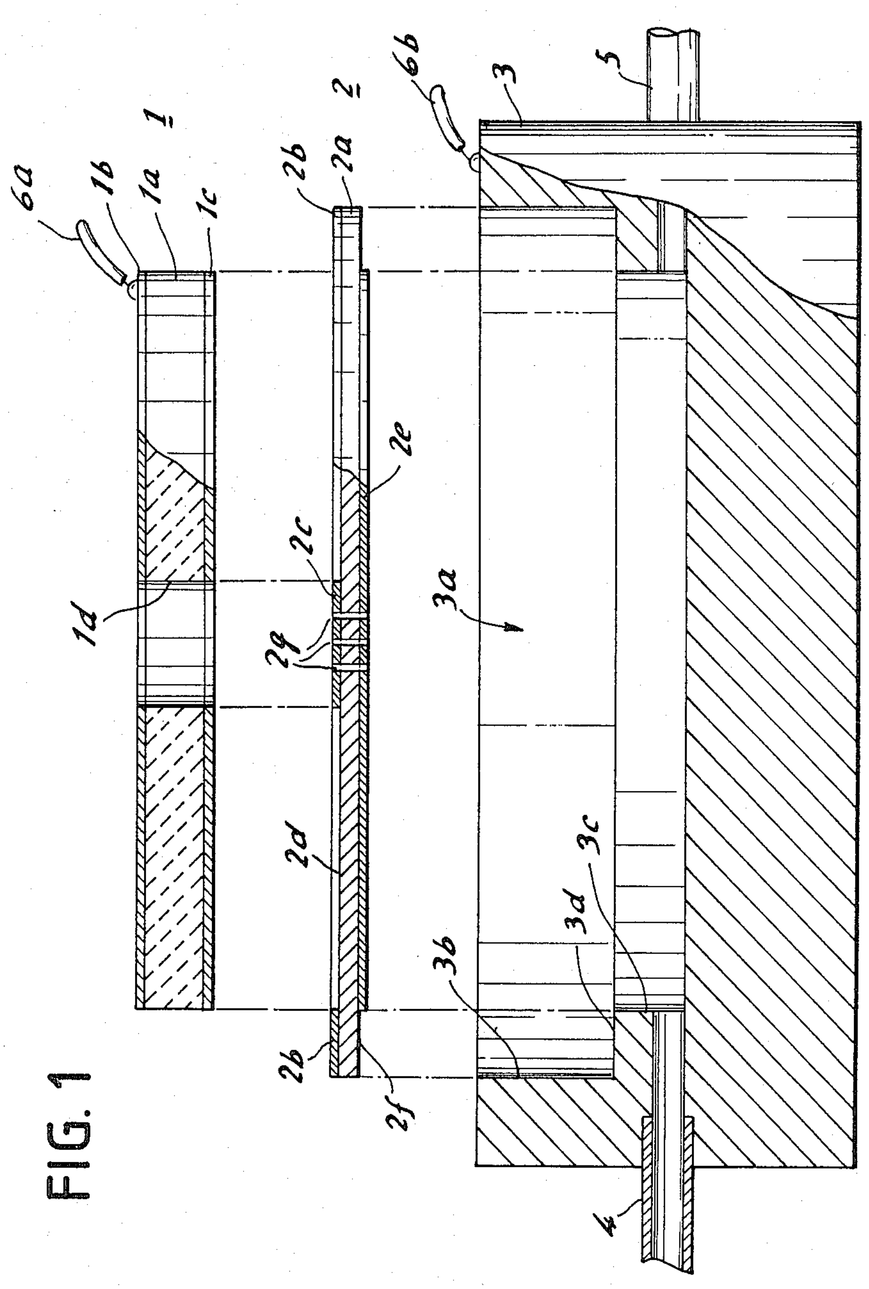
FIG. 1 is a cross-sectional view in elevation of an ultrasonic liquid ejecting unit of the invention, with the components being separately shown for purposes of clarity.

In FIG. 1, an ultrasonic atomizer embodying the invention comprises a transducer 1 formed of a piezoelectric disc 1*a* of a ceramic substance such as PbO, TiO2, ZrO2 or the like having a diameter of 5 to 15 mm, and a pair of film electrodes 1*b*, 1*c* one on each opposite surface of the disc 1. These electrodes are formed by vacuum deposition of copper of the like material having a strong affinity to soldering materials and a high electrical conductivity. A circular hole 1*d* of 2 to 6 mm diameter is formed in coaxial relationship with the axis of the atomizer.

A metallic atomizer body 3 is formed with a stepped recess 3*a* having a larger diameter portion 3*b* and a smaller diameter portion 3*c*. A shoulder 3*d* between the larger and smaller diameter portions presents a flat surface of a ring for soldering purposes. The smaller diameter portion 3*c* has a depth of 1 to 5 mm the axial direction to form a liquid chamber in communication with an inlet port 4 connected to a liquid supply source and an overflow port 5.

Illustrated at 2 is a vibration member comprising a metallic disc 2*a*, 30 to 100 micrometers thick, formed of Kovar or the like exhibiting a strong affinity to soldering materials. On opposite surfaces of the disc 2*a* are vacuum deposited patterns of metallic resist film with a thickness of up to 2 micrometers which exhibits inactive property to soldering materials. Chromium is one example for this purpose. The solder-inactive film on the front surface of the disc 2*a* is in a pattern of a ring 2*b* having an inner diameter equal to the outer diameter of the piezoelectric disc 1*a* and an outer diameter equal to that of the larger diameter portion 3*b* of the body 3, and a disc 2*c* having a diameter equal to that of the center hole 1*d* of the transducer. Between the resist patterns 2*b* and 2*c* is thus formed an annular-shaped, solder-active region 2*d* which conforms to the surface of the electrode 1*c*. The solder-inactive film on the rear surface takes the shape of a disc 2*e* having a diameter equal to the diameter of the smaller diameter portion 3*d* of the body 3. An annular-shaped solder-active region 2*f* is thus formed which conforms to the annular-shaped shoulder 3*d* of body 3. a plurality of axially extending throughbores or nozzle openings 2*g* are provided in the center area of the disc 2.

A first terminal of a excitation voltage source is connected by an insulated lead wire 6*a* to the electrode 1*b* of the transducer and a second terminal of the voltage source is connected by an insulated lead wire 6*b* to the metal body 3.

Figure 2:
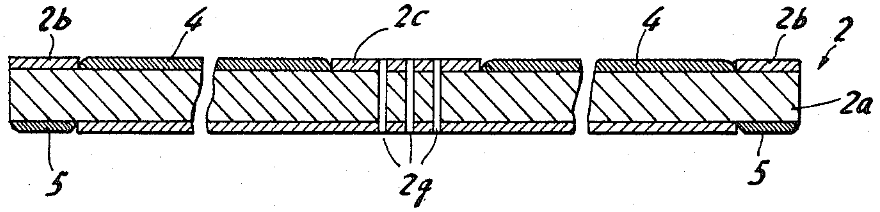
FIG. 2 is a cross-sectional of the nozzle plate of FIG. 1 after molten solder is applied thereto.

During assemblage, the nozzle plate 2 is dipped it into a molten solder tank and then placed into contact with the transducer 1 and then the body 3. The solder is allowed to set. In this process, the molten solder sticks only to the solder-active areas and spreads evenly over the surfaces 2*d* and 2*f* to form molten solder layers 4 and 5 of a uniform thickness as shown in FIG. 2. Since the conductive film 1*c* presents strong affinity to solder, the solder layer 4 wets the entire surface of the film 1*c* by expelling air which might otherwise be entrapped. Little or no voids thus occur between the adjacent surfaces of the transducer 1 and the nozzle plate 2. The nozzle plate 2 is in pressure transmitting relationship with the liquid in the chamber 3*c* of the body 3. The nozzle plate 2 is deflected in response to the energization of the transducer 1 by an ultrasonic frequency pulse to induce a pressure rise in the liquid to effect ejection of liquid droplets through the nozzle openings 2*g*.

Figure 3:
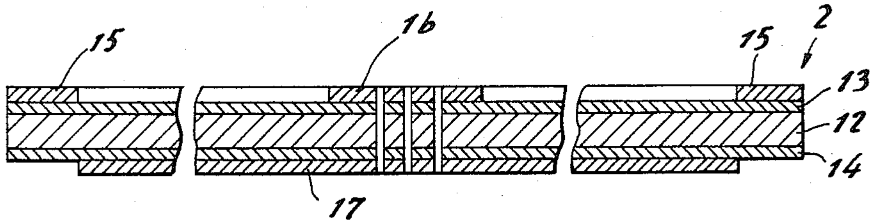
FIGS. 3 and 4 are alternative embodiments of the invention.

In FIG. 3, an alternative form of the nozzle plate 2 is illustrated. In this modification, a metal disc 12 of a material having solder inactive property such as stainless and titanium is vacuum deposited on opposite surfaces with layers 13 and 14 having a thickness of 1 to 2 micrometers of solder-active material. A solder-resist layer 15 of outer, ring pattern and a layer 16 of inner, circular pattern are formed on the layer 13 in a manner identical to that described above. Likewise, a solder-resist layer 17 identical to the layer 2*e* is also formed on the layer 14. Each of the films 13 and 14 preferably comprises a first layer of chromium which assures strong bonding to the solder inactive disc 12 and a second layer deposited on the first. The second, overlying layer is composed of gold to prevent oxidation.

Figure 4:
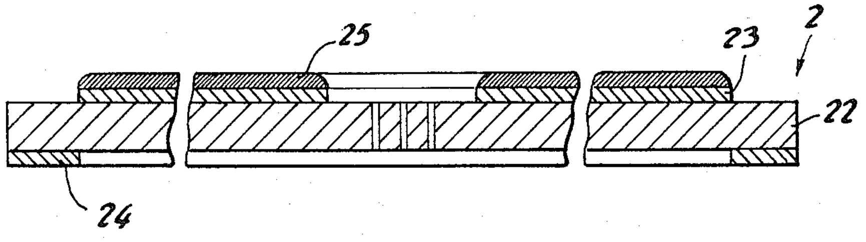

FIG. 4 illustrates a further alternative form of the nozzle plate 2. A solder inactive disc 22 is vacuum deposited on one surface with a solder active layer 23 and a solder active layer 24 on the other surface, each of these layers having a pattern complementary to the resist pattern of the corresponding surface in FIG. 3. By dipping the nozzle plate 22 into the solder tank, molten solder will form a solder layer 25 of uniform thickness exclusively on the solder-active layer 23 and a solder layer 26 of uniform thickness exclusively on the solder-active layer 24.

What is claimed is:

1. A method for making an ultrasonic liquid ejecting unit, comprising the steps of:

(a) providing a piezoelectric transducer having first and second opposite flat surfaces each coated with a conductiive film and an aperture through said first and second surfaces;

(b) providing a nozzle plate of a material having a first cement-active surface for making contact with the second surface of said transducer and a second cement-active surface and a nozzle opening;

(c) providing a body having a contact surface for making contact with the second cement active surface of said nozzle plate and a chamber behind said contact surface for holding liquid therein;

(d) forming a first and a second pattern of adjoining regions of cement-inactive and cement-active properties on said first and second surfaces of said nozzle plate respectively, said cement-active regions of said first and second patterns conforming respectively to said second surface of said transducer and to said contact surface of said body;

(e) applying a cementing material in liquid phase to said first and second surfaces of said nozzle plate so that a first uniform layer of cement is formed on said first cement-active region and a second uniform layer of cement is formed on said second cement-active region; and (f) contacting the cement-applied first and second surfaces of said nozzle plate with said second surface of said transducer and with said contact surface of said body, respectively, whereby said nozzle plate defines said chamber to allow ejection of liquid droplets through said nozzle opening and said aperture to the outside when said nozzle plate is deflected toward said chamber upon energization of said transducer.

2. A method for making an ultrasonic liquid ejecting unit, comprising the steps of:

(a) providing a ring shaped piezoelectric transducer having first and second opposite flat surfaces each coated with a conductive film and;

(b) providing a nozzle disc of a material having a first surface for making contact with the second surface of said transducer and a second surface and a nozzle opening extending between said first and second surfaces;

(c) providing a body having a contact surface for making contact with the second solder-active surface of said nozzle disc and a chamber behind said contact surface for holding liquid therein;

(d) forming a first and a second pattern of adjoining regions of solder-inactive and solder-active properties on said first and second surfaces of said nozzle disc respectively, said solder-active regions of said first and second patterns conforming respectively to said second surface of said transducer and to said contact surface of said body;

(e) applying a soldering material in liquid phase to said first and second surfaces of said nozzle disc so that a first uniform layer of solder is formed on said first solder-active region and a second uniform layer of solder is formed on said second solder-active region; and (f) contacting the solder-applied first and second surfaces of said nozzle disc with said second surface of said transducer and with said contact surface of said body, respectively, whereby said nozzle disc defines said chamber to allow ejection of liquid droplets through said nozzle opening and through the center aperture of said ring-shaped transducer to the outside when said nozzle disc is deflected toward said chamber upon energization of said transducer.

3. A method as claimed in claim 2, wherein said first pattern comprises an outer, ring shaped solder-inactive region and an inner, circular shaped solder-inactive region defining therebetween said first-solder active region.

4. A method as claimed in claim 2, wherein the conductive film coated on said second surface of said piezoelectric transducer is composed of a material having a strong affinity to solder.

5. A method as claimed in claim 2, wherein said nozzle disc comprises a metal having a strong affinity to solder, and wherein the step (d) comprises depositing a solder-inactive material on said first and second solder-active surfaces of said nozzle disc to form said solder-inactive regions of said first and second patterns.

6. A method as claimed in claim 5, wherein said nozzle disc comprises a metal having a solder-inactive property, and wherein the step (d) further comprises depositing a solder-active layer on each surface of said disc to provide said first and second solder-active surfaces prior to the deposition of said solder-inactive material thereon.

7. A method as claimed in claim 2, wherein said nozzle disc comprises a metal having a solder-inactive property, and wherein the step (d) comprises depositing a solder-active material on said disc to form said solder-active regions of said first and second patterns.

8. An ultrasonic liquid ejecting unit comprising:

a piezoelectric transducer having a pair of first and second conductive films coated on opposite sides thereof, and an opening at the center thereof;

a body having a contact surface and a chamber behind said contact surface for holding liquid therein and an intake port connected to said chamber for supplying liquid thereto from a liquid supply source;

a metallic nozzle plate having a nozzle opening, first and second patterns of adjoining regions of cement-active and cement-inactive properties on opposite sides thereof, said cement-active region of the first pattern conforming to and secured to said second surface of said transducer by way of a layer of cementing material so that said nozzle opening is positioned within the opening of said transducer, said cement-active region of the second pattern conforming to and secured to said contact surface of said body by way of a layer of cementing material to define said chamber to thereby establish a pressure transmitting relationship with the liquid in said chamber.

9. An ultrasonic liquid ejecting unit comprising:

a ring-shaped piezoelectric transducer having a pair of first and second conductive films coated on opposite sides thereof;

a body having a contact surface and a chamber behind said contact surface for holding liquid therein and an intake port connected to said chamber for supplying liquid thereto from a liquid supply source;

a metallic nozzle disc having a nozzle opening, first and second patterns of adjoining regions of solder-active and solder-inactive properties on opposite sides thereof, said solder-active region of the first pattern conforming to and secured to said second surface of said transducer by way of a layer of soldering material so that said nozzle opening is positioned within the opening of said transducer, said solder-active region of the second pattern conforming to and secured to said contact surface of said body by way of a layer of soldering material to define said chamber to thereby establish a pressure transmitting relationship with the liquid in said chamber.

10. A ultrasonic liquid ejecting unit as claimed in claim 9, wherein said first pattern comprises an outer, ring shaped solder-inactive region and an inner, circular shaped solder-inactive region defining therebetween said first-solder active region.

11. An ultrasonic liquid ejecting unit as claimed in claim 9, wherein the conductive film coated on said second surface of said piezoelectric transducer is composed of a material having a strong affinity to solder.

* * * * *